(12) United States Patent
Macey

(10) Patent No.: US 8,566,196 B2
(45) Date of Patent: *Oct. 22, 2013

(54) SYSTEM AND METHOD FOR INCORPORATING MORTALITY RISK IN AN INVESTMENT PLANNING MODEL

(75) Inventor: Rex Macey, Atlanta, GA (US)

(73) Assignee: Macey-Holland & Company, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,332

(22) Filed: Jun. 13, 2011

(65) Prior Publication Data
US 2011/0276517 A1    Nov. 10, 2011

Related U.S. Application Data

(63) Continuation of application No. 12/566,502, filed on Sep. 24, 2009, now Pat. No. 7,962,392, which is a continuation of application No. 11/225,219, filed on Sep. 13, 2005, now Pat. No. 7,603,306, and a continuation of application No. 09/625,702, filed on Jul. 25, 2000, now Pat. No. 6,947,904.

(60) Provisional application No. 60/146,532, filed on Jul. 30, 1999, provisional application No. 60/168,331, filed on Dec. 1, 1999.

(51) Int. Cl.
*G06Q 40/00*    (2012.01)

(52) U.S. Cl.
USPC .............................................. 705/35; 705/4

(58) Field of Classification Search
USPC ................................................... 705/4, 7, 35
See application file for complete search history.

(56) References Cited

U.S. PATENT DOCUMENTS

| | | | | |
|---|---|---|---|---|
| 5,148,365 | A * | 9/1992 | Dembo | 705/36 R |
| 5,930,760 | A * | 7/1999 | Anderton et al. | 705/4 |
| 6,012,044 | A * | 1/2000 | Maggioncalda et al. | 705/36 R |
| 6,064,969 | A * | 5/2000 | Haskins | 705/4 |
| 6,947,904 | B1 * | 9/2005 | Macey | 705/36 R |
| 7,577,597 | B1 * | 8/2009 | Allison et al. | 705/35 |
| 7,603,306 | B2 * | 10/2009 | Macey | 705/35 |
| 7,778,907 | B1 * | 8/2010 | Haskins et al. | 705/36 R |
| 7,788,155 | B2 * | 8/2010 | Jones et al. | 705/36 R |
| 7,813,989 | B2 * | 10/2010 | Jones et al. | 705/36 R |
| 7,962,388 | B2 * | 6/2011 | Macey | 705/35 |
| 7,962,392 | B2 * | 6/2011 | Macey | 705/35 |
| 7,983,975 | B2 * | 7/2011 | Jones et al. | 705/36 R |
| 2004/0177021 | A1 * | 9/2004 | Carlson et al. | 705/36 |
| 2005/0027645 | A1 * | 2/2005 | Lui et al. | 705/38 |
| 2009/0204442 | A1 * | 8/2009 | Logsdon et al. | 705/4 |
| 2010/0280971 | A1 * | 11/2010 | Haskins et al. | 705/36 R |

* cited by examiner

*Primary Examiner* — Narayanswamy Subramanian
(74) *Attorney, Agent, or Firm* — Ballard Spahr LLP

(57) ABSTRACT

A method and system for determining possible future value of a portfolio of joint investors including receiving user inputs, determining an age of death of joint investors in accordance based on the current age of the respective first and second joint investors and randomly drawn numbers, and computing a future value of the portfolio using said greater age of death of the joint investors, a predetermined rate of return, and the initial value of the portfolio.

19 Claims, 14 Drawing Sheets

SYSTEM AND METHOD FOR INCORPORATING MORTALITY RISK IN AN INVESTMENT PLANNING MODEL

RELATED APPLICATIONS

This application is a continuation of U.S. application Ser. No. 12/566,502, filed Sep. 24, 2009 (now U.S. Pat. No. 7,962,392, which issued Jun. 14, 2011); which is a continuation of U.S. application Ser. No. 11/225,219, filed Sep. 13, 2005 (now U.S. Pat. No. 7,603,306, which issued Oct. 13, 2009); and is a continuation of U.S. application Ser. No. 09/625,702, filed Jul. 25, 2000 (now U.S. Pat. No. 6,947,904, which issued Sep. 20, 2005); which claims priority benefit of Provisional Application Nos. 60/146,532 and 60/168,331, which were filed on Jul. 30, 1999 and Dec. 1, 1999, respectively. The aforementioned applications are hereby incorporated herein by reference in their entireties.

BACKGROUND OF THE INVENTION

1. Field of the Invention

The present invention relates to financial management systems and, more particularly, to a method and an apparatus for effecting a retirement planning system incorporating means for planning, analyzing, and preparing reports on an investment portfolio comprised of various financial assets owned by one or more investors.

2. Description of the Related Art

Retirement planning is a frustrating exercise because the future is uncertain. Nonetheless, prior art retirement calculators often employ deterministic models that output seemingly precise predicted value of a portfolio. Typically, a user is required to input a number of parameters such, for example, as a fixed rate of inflation, a fixed rate of return, and a specified retirement age. Using these user-input values, the prior art calculators compute a future value of the portfolio at the specified retirement age or at some other specified point in time. This computed portfolio value, however, is of limited use to an investor, or may even be misleading to the investor, because the chance of achieving the computed value is not at all certain, but lies somewhere between 0% and 100%. As any competent investor knows, future rate of return or rate of inflation varies from month-to-month and from year-to-year, depending on a myriad of highly variable economic parameters. Moreover, one's actual life span may be shorter or longer than that published in a life expectancy table, thereby creating further uncertainties in the computed portfolio value.

U.S. Pat. No. 5,918,217 to Maggioncalda et al. discloses a financial advisory system for assisting an investor to select a mix of financial products that would achieve a specified retirement goal. The system has a user interface that enables the investor to interactively explore how changes in one or more input decisions such as risk tolerance, savings level, and retirement age affect one or more output values such as a probability of achieving a financial goal. The system further includes a simulation module that generates a probability distribution for a projected asset valuation. However, Maggioncalda et al. does not disclose, for example, the use of Monte Carlo simulation techniques to vary the retirement age of the investor to more realistically demonstrate the chances of achieving the investor's retirement goals.

Accordingly, there is a need for a retirement planning system that uses Monte Carlo techniques to vary the life span of an investor and/or to vary the rate of return of a portfolio so as to more completely describe an investor's chances of achieving a retirement goal.

SUMMARY OF THE INVENTION

An object of the present invention is to provide an easy-to-use and a cost-effective method and apparatus for effecting an improved financial management system that enables a user (e.g. an investor) to realistically predict or project the future value of an investment portfolio while taking into consideration variations in the rate of return of the investment portfolio and/or mortality risks of the investor(s) over time.

According to one aspect of the invention, the inventive system computes possible future values of a portfolio while varying an investor's life span and the portfolio's rate of return using Monte Carlo simulation techniques. The portfolio may consist of assets owned by a single investor or jointly by a plurality of investors.

According to another aspect of the invention, the inventive system randomly generates a rate of return for a subdivided time period $T_s$, such for example, as a year or a month, from a user-supplied distribution of rates of return such as historical returns or a lognormal distribution having a specified mean and standard deviation.

According to still another aspect of the invention, the inventive system produces possible future returns or values of an investment portfolio by varying hypothetical life spans of the investor over a plurality of trials. The system varies the length of each trial by randomly (or pseudo-randomly) generating a number between (and including) 0 and 1 in each trial for each investor and comparing the generated number with a corresponding probability of dying (i.e. mortality rate) of each investor using a mortality table. An investor's hypothetical life in a trial is terminated if his/her mortality rate is greater than or equal to the randomly generated number; otherwise, the investor lives to an age of death indicated by the mortality table in accordance with the generated number. A trial ends when the hypothetical lives of all joint investors are terminated in the trial. Optionally, a random (or pseudo-random) number is generated for each investor at the beginning of each subdivided period $T_s$ and which is then compared to a chance of dying from the mortality table so as to determine whether the investor lives the upcoming subdivided period $T_s$.

According to yet another aspect of the invention, the inventive system employs user-specified mortality rates or mortality factors (e.g. age, sex, and race) to modify published mortality rates so as to more accurately model an investor's anticipated life span.

According to still another aspect of the invention, the inventive system computes net cash flow of a portfolio, while taking into account scheduled contributions and withdrawals by the investor(s) during a specified period.

The inventive system advantageously produces useful results such as the following:

1. the value of a portfolio during each subdivided period in each trial;
2. the value of a portfolio at the end of each trial;
3. whether a portfolio, in each trial, has met a stated investment objective;
4. the probability of meeting (or not meeting) an investment objective for all trials;
5. the distribution of portfolio values over a specified period for each trial and the remainder value of the portfolio after all specified trials are completed;
6. the age-at-death of each investor at the end of each trial;

7. the distribution of each investor's age-at-death for all trials;

8. the distribution of ages of the investors in the group for all trials; and 9. the probability of each investor living to a specified age.

In one embodiment, there is provided a retirement planning method for computing possible future values of a portfolio of an investor. The method includes the steps of (a) receiving a plurality of user inputs comprising an initial value of the portfolio and a current age of the investor; (b) providing data indicating cumulative probabilities of living to an age of death and/or cumulative probabilities of dying at an age of death for persons of a given age group; (c) randomly drawing a number between and including 0 and 1 for the investor; (d) defining the randomly drawn number as either a cumulative probability of living to an age of death or a cumulative probability of dying at an age of death; (e) determining an age of death of the investor in accordance with the data based on the current age of the investor and the randomly drawn number; (f) computing a future value of the portfolio using the age of death of the investor determined in step (e), a predetermined rate of return, and the initial value of the portfolio; and (g) outputting the computed future value of the portfolio.

In another embodiment, a retirement planning method for computing a possible future value of a portfolio of an investor includes the steps of:

(a) receiving user inputs comprising an initial value of the portfolio and a current age of the investor;

(b) randomly drawing a number between 0 and 1 (which may include one or more end points);

(c) determining a mortality rate of the investor in accordance with a mortality table based on the current age of the investor;

(d) comparing the randomly drawn number with the determined mortality rate using a preselected logical relation:

(1) if the randomly drawn number satisfies the preselected logical relation with the determined mortality rate of the investor, defining the current age as the age of death of the investor;

(2) if the randomly drawn number does not satisfy the preselected logical relation with the determined mortality rate, advancing the current age of the investor to a next age group indicated in the mortality table and repeating steps (b) through (d);

(e) computing a future value of the portfolio using the age of death defined in step (d)(1), a predetermined rate of return, and the initial value of the portfolio; and (f) outputting the computed future value of the portfolio.

In yet another embodiment, a retirement planning method for computing a possible future value of a portfolio of an investor, comprises the steps of:

(a) receiving user inputs comprising an initial value of the portfolio and a current age of the investor;

(b) randomly drawing a number between 0 and 1 (which may include one or more end points) for the investor;

(c) determining a mortality rate of the investor in accordance with a mortality table based on the current age of the investor;

(d) comparing the randomly drawn number with said determined mortality rate using a preselected logical relation such that:

(1) if the randomly drawn number satisfies said preselected logical relation with said determined mortality rate of the investor, define the current age as the age of death of the investor, and output a current value of the portfolio as a future value of the portfolio;

(2) if the randomly drawn number does not satisfy said preselected logical relation with said determined mortality rate, compute a current value of the portfolio using a predetermined rate of return for a predetermined period, advance the current age of the investor by another predetermined period, and repeat steps (b) through (d).

In still another embodiment, a retirement planning method for computing a possible future value of a portfolio of a plurality of joint investors includes the steps of:

(a) receiving user inputs comprising an initial value of the portfolio, a current age of a first joint investor, and a current age of a second joint investor;

(b) randomly drawing a number between 0 and 1 (which may include one or more end points) for each of the first and second joint investors;

(c) determining a mortality rate of each of the first and second joint investors in accordance with a mortality table based on the current age of the first and second joint investors;

(d) comparing the randomly drawn numbers of the first and second joint investors with corresponding mortality rates determined for the first and second joint investors in step (c) using a preselected logical relation such that:

(1) if both of the randomly drawn numbers of the first and second joint investors satisfy the preselected logical relation with said mortality rates of the first and second joint investors respectively, define the current age of the first and second joint investors as the age of death of the first and second joint investors and output a current value of the portfolio as a future value of the portfolio;

(2) if only one of the randomly drawn numbers does not satisfy the preselected logical relation with said determined mortality rate:

(i) compute a current value of the portfolio using a predetermined rate of return for a predetermined period;

(ii) advance the current age of that joint investor whose randomly drawn number does not satisfy said preselected logical relation by another predetermined period;

(iii) randomly draw a number between 0 and 1 (which may include one or more end points) for that joint investor;

(iv) determine the mortality rate of that joint investor in accordance with the mortality table based on the current age of that joint investor determined in step (ii);

(v) if the randomly drawn number satisfies the preselected logical relation with the mortality rate determined in step (iv), define the current age of that joint investor as the age of death of that joint investor, and output the current value of the portfolio as a future value of the portfolio; and (vi) if the randomly drawn number does not satisfy the preselected logical relation with the mortality rate determined in step (iv), repeat steps (i) through (vi) for another predetermined period.

Definitions or descriptions of some key terms are as follows:

Mortality table: a table containing the probability that a person who reaches a specified age dies within the specified period. For example, a table may show that a person who reaches the age of 50 has a 0.30% chance of dying while age 50.

Vitality table: a table containing the probability that a person who reaches a specified age lives through the specified period. These probabilities are equal to 100% less the corresponding probability in a mortality table.

Mortality table with Cumulative Probabilities: a table containing the probability that a person will not live to a specified age (i.e. die before the specified age). For example, such a table may show that a person has a 40% probability of not reaching age 75 (dying before age 75). This type of table may be derived from the mortality table.

Vitality table with Cumulative Probabilities: a table containing the probability that a person will live to a specified age. For example, such a table may show that a person has a 60% probability of reaching age 75. This person will have a higher probability of reaching younger ages, and a lower probability of reaching higher ages. This type of table may be derived from the mortality table.

Joint mortality table: a table containing the probability that Person 1 will die at Age X and Person 2 will die at Age Y. Such a table may be constructed from a mortality table for each person. A mortality table for a Person 1 would have probabilities of dying at ages X+1 through age 110 (or some other specified age). Such a table would contain 110-X entries. A joint mortality table would have probabilities for every possible pair of ages at death. For a table up to age 110, this would be [(110-X)*(110-Y)] probabilities. From our perspective, the two tables both contain probabilities that an event will happen. The mortality table gives the probability that a person dies at a given age. The joint mortality table gives the probability that two persons die at two specified ages. The joint mortality table can be used to construct a joint mortality table with cumulative probabilities.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements and method steps throughout the Figures.

DETAILED DESCRIPTION

The present invention is directed to a data processing system for use by a financial advisor or investor(s) for investment planning such, for example, as retirement planning The inventive data processing system is configured to apply Monte Carlo simulation techniques to compute or predict possible future values of one or more investment portfolios while varying an investor's life span and/or rates of return during each hypothetical life span of an investor. A portfolio may be owned entirely by a single investor or jointly by a group of investors. The possible future values of the investment portfolio are calculated for a number of trials (e.g. 1000), with each trial representing a possible (or hypothetical) life of the single investor or a "joint" life 10 of the group of investors (e.g. a married couple). The system may also take into account cash flow including, without limitation, contributions by an investor during his/her working years and withdrawals by the investor during his/her retirement years.

In a preferred embodiment, the system randomly or pseudo-randomly generates a rate of return from data representing historical returns or a user-specified distribution such, for example, as a lognormal distribution having a specified mean and standard deviation. (It is noted that the terms "random" and "pseudo-random" are used interchangeably herein.) The system also randomly or pseudo-randomly generates a number between 0 and 1 (e.g. a number greater than zero and less than one and which may include one or more end points) for each investor and compares the randomly generated number with another number representing the investor's chance of dying (from, for example, a mortality table) at the beginning of each trial, for use in determining whether the investor lives in that trial and, if so, for how long. The mortality table may be based on published mortality rates that preferably take into account such mortality factors as, for example, gender, race, and sex. Alternatively, the mortality table may include or comprise mortality rates specified by the user. Instead of using a mortality table, the system includes methods for randomly generating ages at death, as explained more fully below, or the system may assume a fixed life span, as specified by the user, for each investor for all trials. In the latter case, only the rates of return are varied during each trial.

Figure 1:
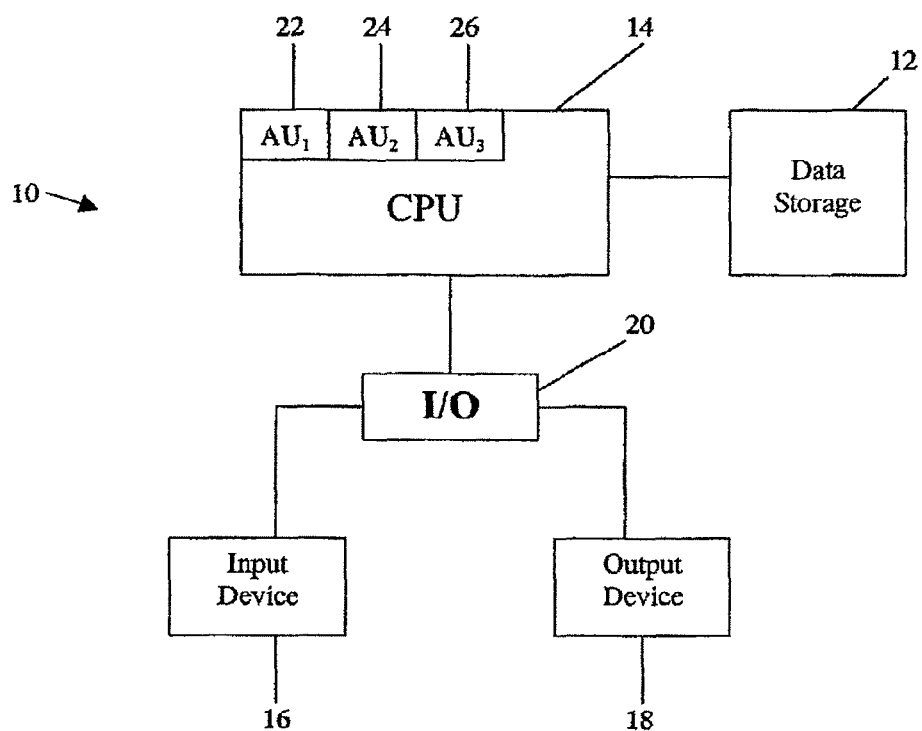
FIG. 1 is a block diagram of a presently preferred embodiment of the inventive system.

Referring now to the drawings, FIG. 1 depicts a data processing system 10 in accordance with the present invention for effecting investment planning and implementing the inventive method. The data processing system 10 may comprise, by way of illustrative example, a personal or digital computer or the like, and includes a data storage device 12 such as a memory device for storing one or more databases and a central processing unit (CPU) 14 for processing data. An input device 16 (e.g. a keyboard and/or a mouse) and an output device 18 (e.g. a monitor and/or a printer) are connected to CPU 14 through an input/output port 20.

The CPU 14 typically comprises, without limitation, arithmetic logic units AU 22, AU 24, and AU 26. AU 22 is configured to store and/or retrieve data from the database(s) stored in data storage device 12. These database(s) may include information such, for example, as historical return data for various asset classes or investment instruments (e.g. long-term corporate and government bonds, or large cap stocks), and a distribution of returns such as a lognormal distribution with a user-specified mean (e.g. 8%) and a user-specified standard deviation (e.g. 9%). The database(s) may further include mortality rates, published and/or user-specified, and mortality factors based on age, sex, race, health, etc. for modifying the mortality rates. Instead of or in addition to these mortality rates, database(s) may also include cumulative probabilities of living to an age of death and/or cumulative probabilities of dying at an age of death. AU 24 is configured to manipulate the retrieved data by, for example, calculating incremental increases and decreases of an investment portfolio based on a rate of return. AU 26 is configured to generate a random or a pseudo-random number for comparison with, for example, another number representing the mortality rate of an investor, the purpose of which comparison will become apparent as this disclosure proceeds.

FIGS. 2A-2F illustrate in flow chart format the basic steps of a method, in accordance with the invention and, by way of example, implemented using the data processing system 10, for effecting financial planning with respect to a financial portfolio. The inventive method is preferably carried out in the form of a computer software program encoded on a machine-readable medium (e.g. a CD-ROM) and/or stored in a program memory of the computing device. Although the steps described herein specifically assume by way of illustration a portfolio jointly owned by a group of investors as, for example, a married couple, it will be readily apparent to the ordinarily skilled artisan that these steps may be readily modified for use with a portfolio owned by a single investor.

Figure 2A:
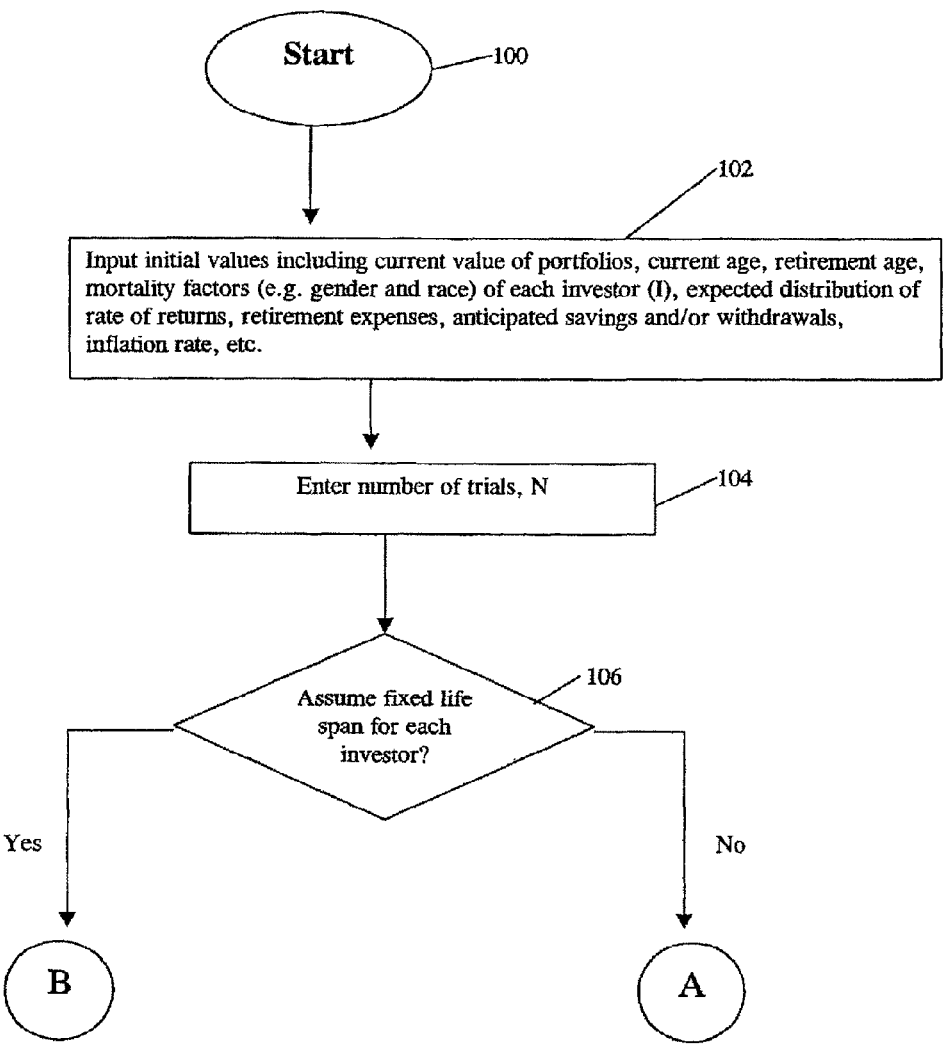
FIGS. 2A-2F provide a flow chart of the basic steps in one embodiment of the inventive method for financial planning.

As seen in FIG. 2A, the inventive method starts at block 100 and requests that the user input for each investor (I) the initial values of investment portfolios, mortality factors (such for example as age, sex, race, and smoking habits), and anticipated savings (or contributions) and withdrawals over a specified period of time, as indicated at block 102. The system may also request that the user specify that the system use a particular type of distribution of rates of return as, for example, a lognormal distribution, historical returns, or any other art-recognized rate-of-return distribution. Preferably, the database(s) include a number of such distributions for selection by the user. The method then proceeds to block 104 to receive input from the user specifying the number of trials (N) to be run for each simulation. Next, in block 106, the user is asked whether to assume a fixed life span for each investor.

If the response to the block 106 query is positive, the method requests at block 108 (FIG. 2B) that the user input the age-at-death of each investor, i.e. the anticipated life span of each investor. The system discretizes time at block 110, as by dividing the longest life span (specified by the user) into M subdivided periods with each subdivided period having a duration of, for example, a month, a year, or a fraction thereof. The user may specify the value of M, which represents the total number of subdivided periods. At block 112, a counter K for counting the number of subdivided periods is initialized to a value of 1 or any suitable initial value $K_0$. The method then compares (at block 114) the current value of K (e.g. $K_0$) with the value of M; if the current value of K is not greater than M—i.e. K is either less than or equal to M, then the method proceeds to block 116 (FIG. 2c) and randomly (or pseudo-randomly) generates a rate of return (R) from, for example, a lognormal distribution or any other art-recognized distribution for each portfolio for the current subdivided period. The value of each portfolio is then adjusted for the current subdivided period at block 118. Cash flow for each portfolio is determined based on each investor's estimated or anticipated contributions, withdrawals and/or taxes owed (or accrued) for the current subdivided period, as indicated at block 120. The method then proceeds to block 122 and adjusts the value of each portfolio by the cash flow determined at block 120. The age of each investor is then incremented by the current subdivided period at block 124.

Figure 2B:
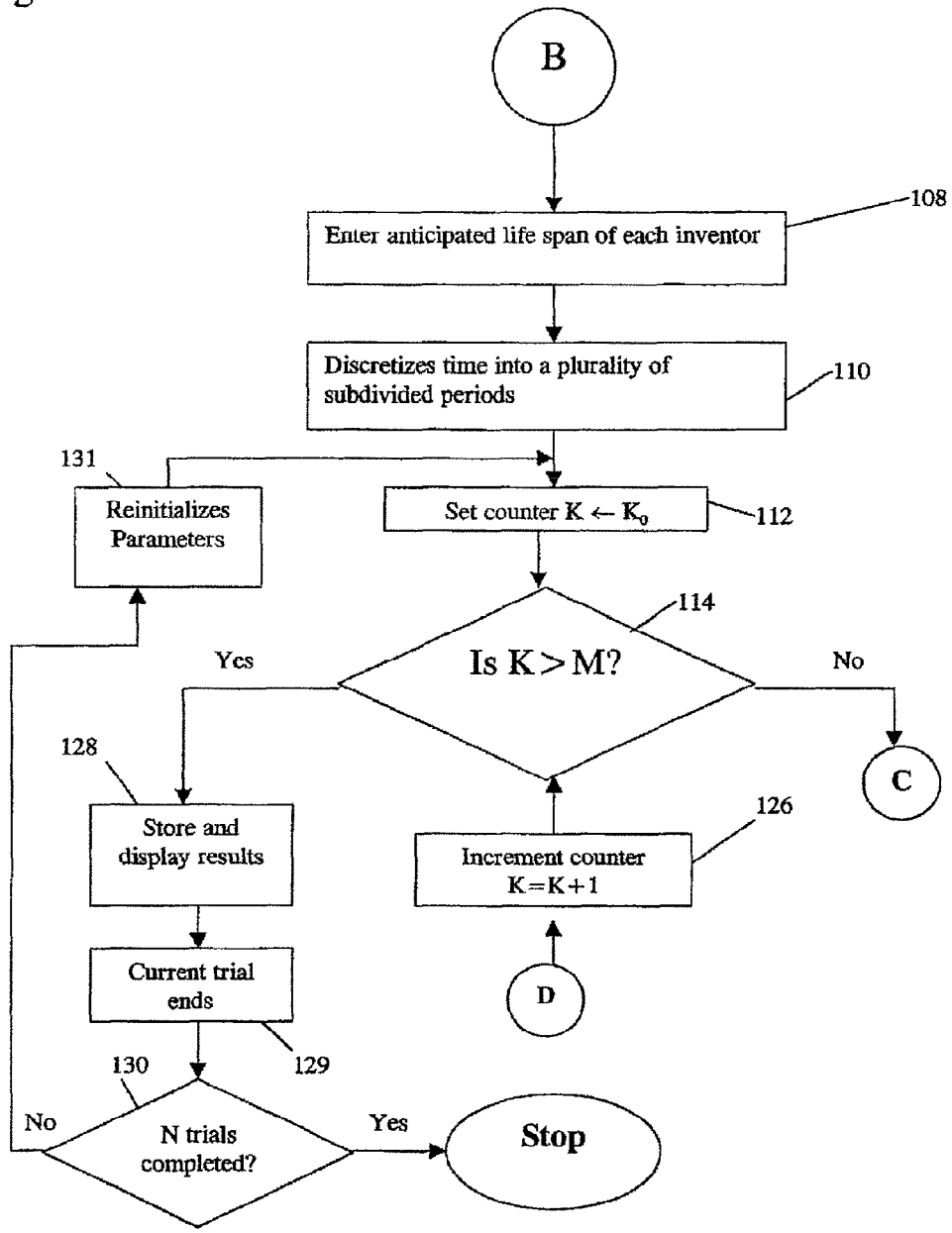
Figure 2C:
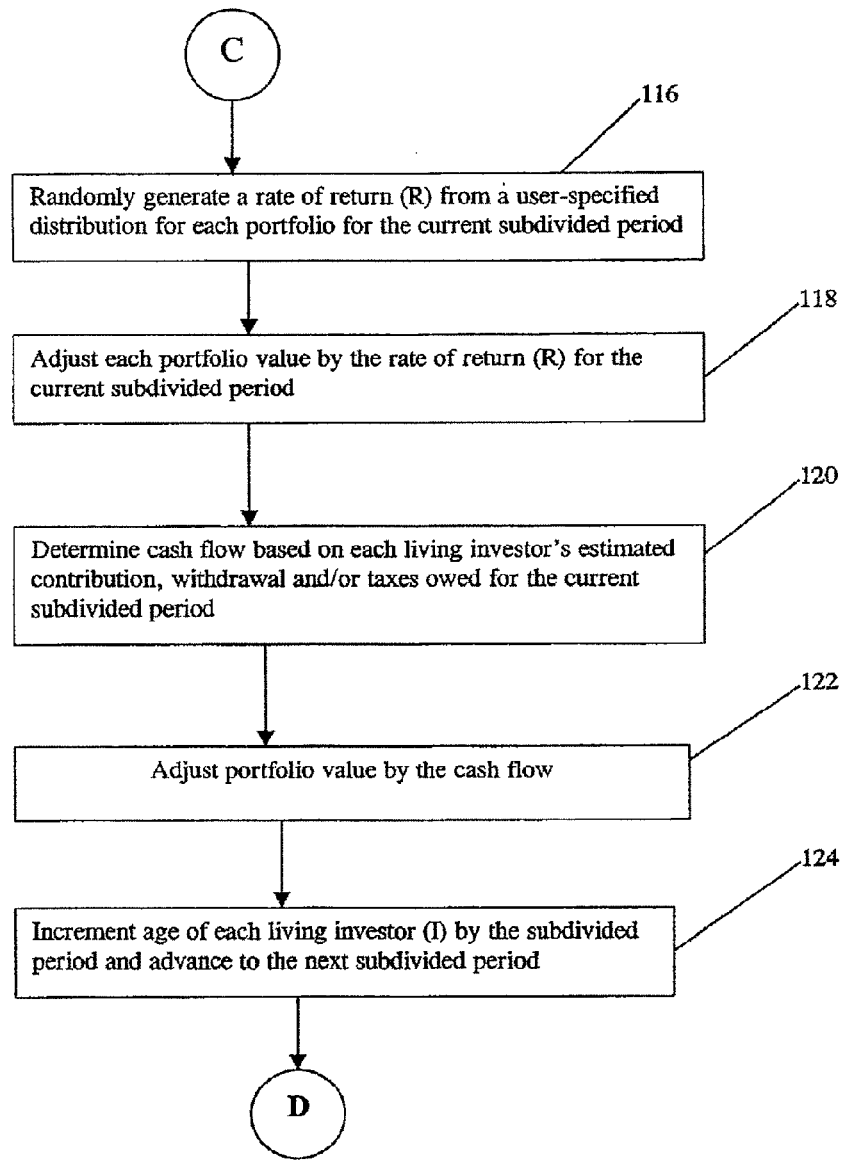
Figure 2D:
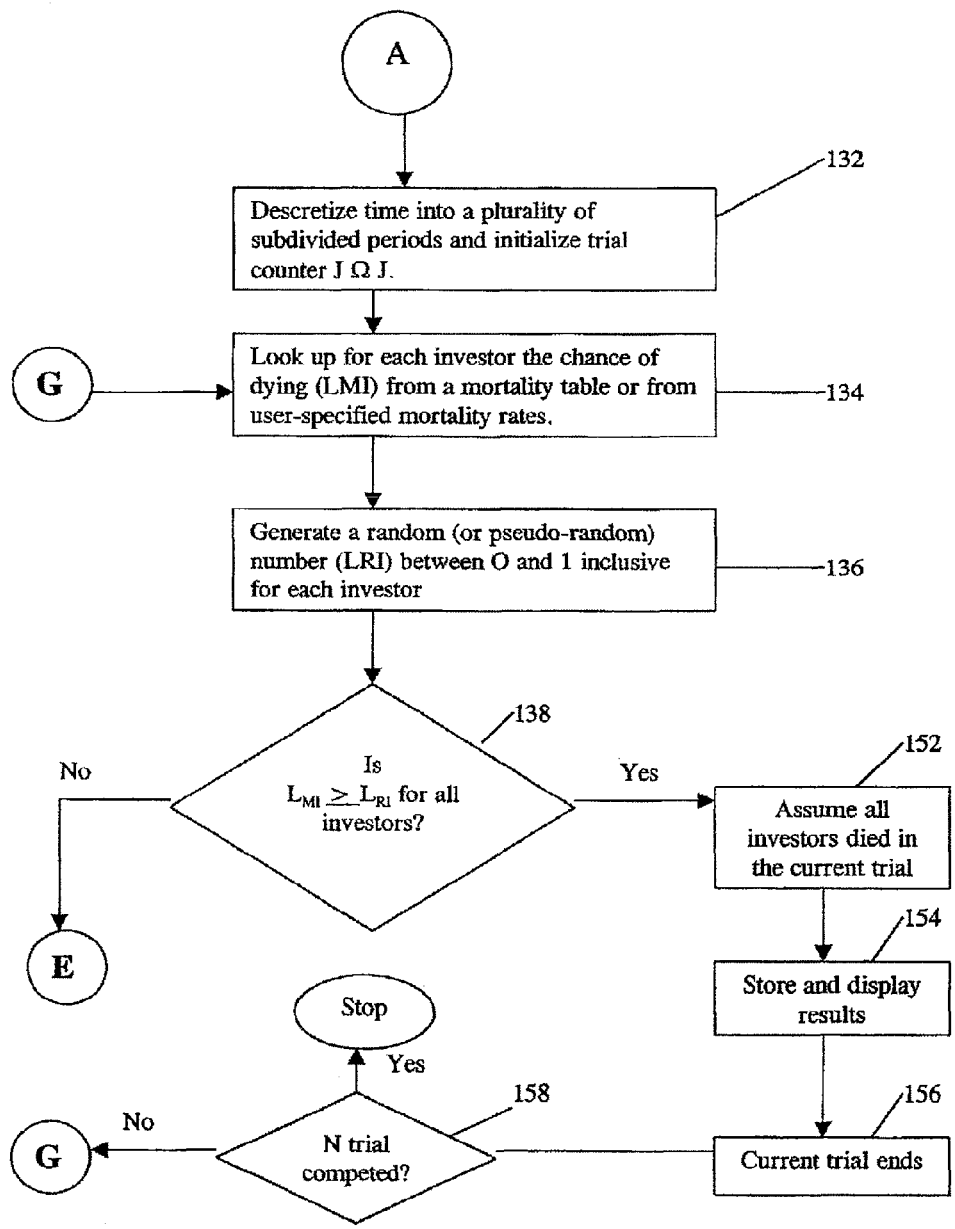
Figure 2E:
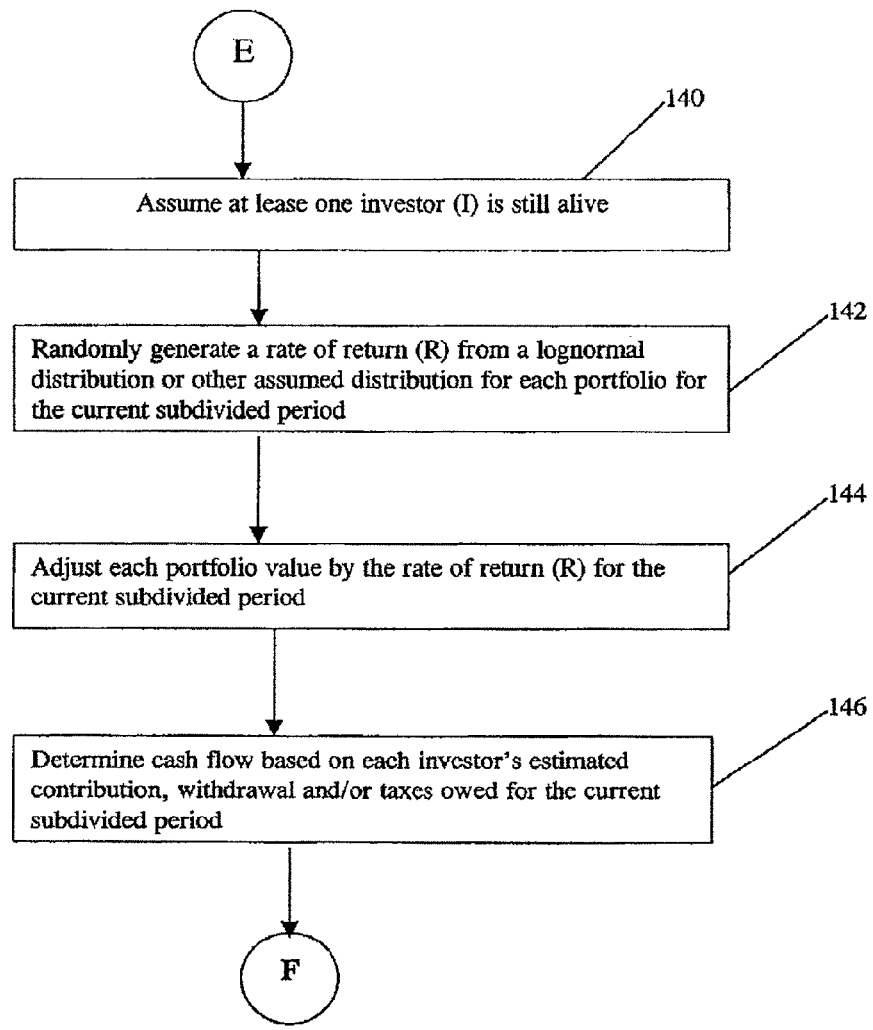
Figure 2F:
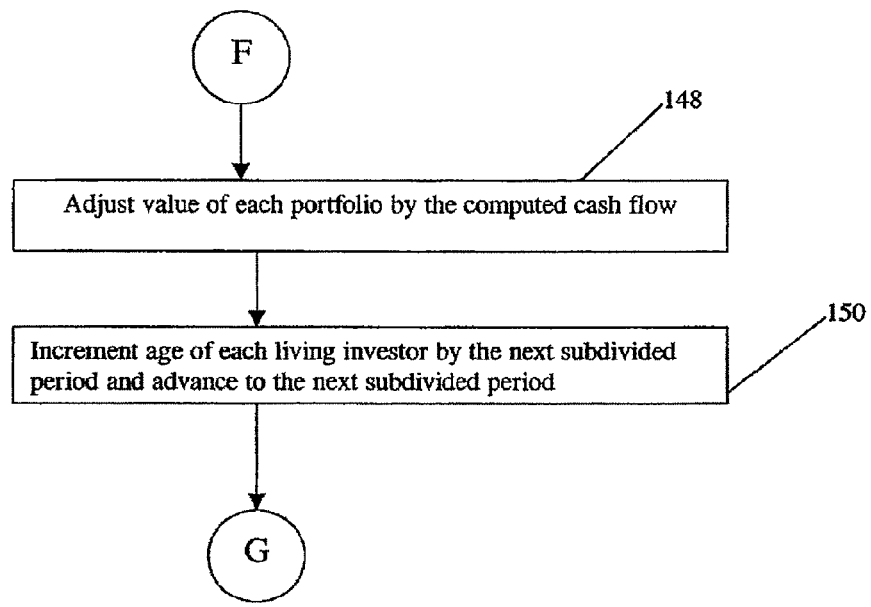

As seen at block 126 in FIG. 2B, the method increments counter K by, for example, an integer value of "1" in block 126 and then returns to block 114. As long as at least one investor is still living (i.e. K is less than or equal to M), the method repeats the steps at blocks 116 through 126 for each successive subdivided period. When the query at block 114 indicates, on the other hand, that K is greater than M, i.e. the current subdivided period is beyond the specified life span of the longest living investor, then the method stores and displays results, as shown at block 128, and ends the current trial at block 129. The method then determines whether N trials have been completed in block 130. If so, the simulation run is ended. If not, the method proceeds to block 131 and reinitializes parameters, that include, for example, the current age of each investor and current subdivided period, to their initial values and starts another trial at block 112.

Where the answer to the query of block 106 (FIG. 2A) is negative, i.e. if the user does not wish to assume a fixed life span for each investor, then the method proceeds to block 132 of FIG. 2D. There, the method discretizes or subdivides time into a plurality of subdivided periods and initializes trial counter J with $J_0$ having an integer value of, for example, 1. At block 134, the method looks up the chance of dying ($L_{MI}$) from a stored database for each investor (I). A random or a pseudo-random number ($L_{RI}$) is then generated (block 136), having a value between 0 and 1 (which may include one or more end points) for each investor.

At block 138, the current value of $L_{MI}$ is compared to the current value of $L_{RI}$ according to a preselected logical relation such, for example, as "greater than or equal to" (i.e. "≥"). For example, if it is determined that $L_{MI}$ is not greater than or equal to $L_{RI}$ for all investors, then the method proceeds to block 140 (FIG. 2E) and assumes (at block 140) that at least one investor (I) is still alive in the current subdivided period. It should be noted that the duration of the subdivided period may be preset by the system or specified by the user at the beginning of each simulation run. In any event, the method at block 142 randomly (or pseudo-randomly) generates or draws a rate of return (R) from a stored lognormal distribution or other assumed or selected distribution for each portfolio for the current subdivided period. Next, at block 144 the value of each portfolio is adjusted by the randomly generated rate of return (R) for the current subdivided period. At block 146, the method computes cash flow based on each investor's estimated or anticipated contribution, withdrawal and/or taxes owed for the current subdivided period for each portfolio. Then, at block 148 (FIG. 2F), the value of each portfolio is adjusted by the computed cash flow. The age of each investor is next incremented, as by the next subdivided period and is advanced to the following subdivided period, as shown at block 150, at which point the method returns to block 134 (FIG. 2D). The steps of blocks 138 through 150 are repeated until each investor's $L_{MI}$ is greater than or equal to his or her corresponding $L_{RI}$. The method then assumes that all investors in the current trial have died (block 152), and the results are stored and displayed (block 154). The current trial then terminates at block 156. The method proceeds to block 158 and determines whether N trials have been completed. If so, the simulation run is ended. If not, the method goes to block 134.

The computed results may be displayed on a monitor or printed in a tabulated and/or graphical form. Based on these results, the user may revise user-specified parameters such as the average and standard deviation of the rate-of-return distribution and/or the age-at-death of each investor and then the have system execute another simulation run. The user can thus run multiple simulations until acceptable results have been obtained.

FIGS. 3A-3F illustrate the basic steps of another embodiment of the invention for effecting financial planning using, again by way of illustrative example, the data processing system 10.

Figure 3A:
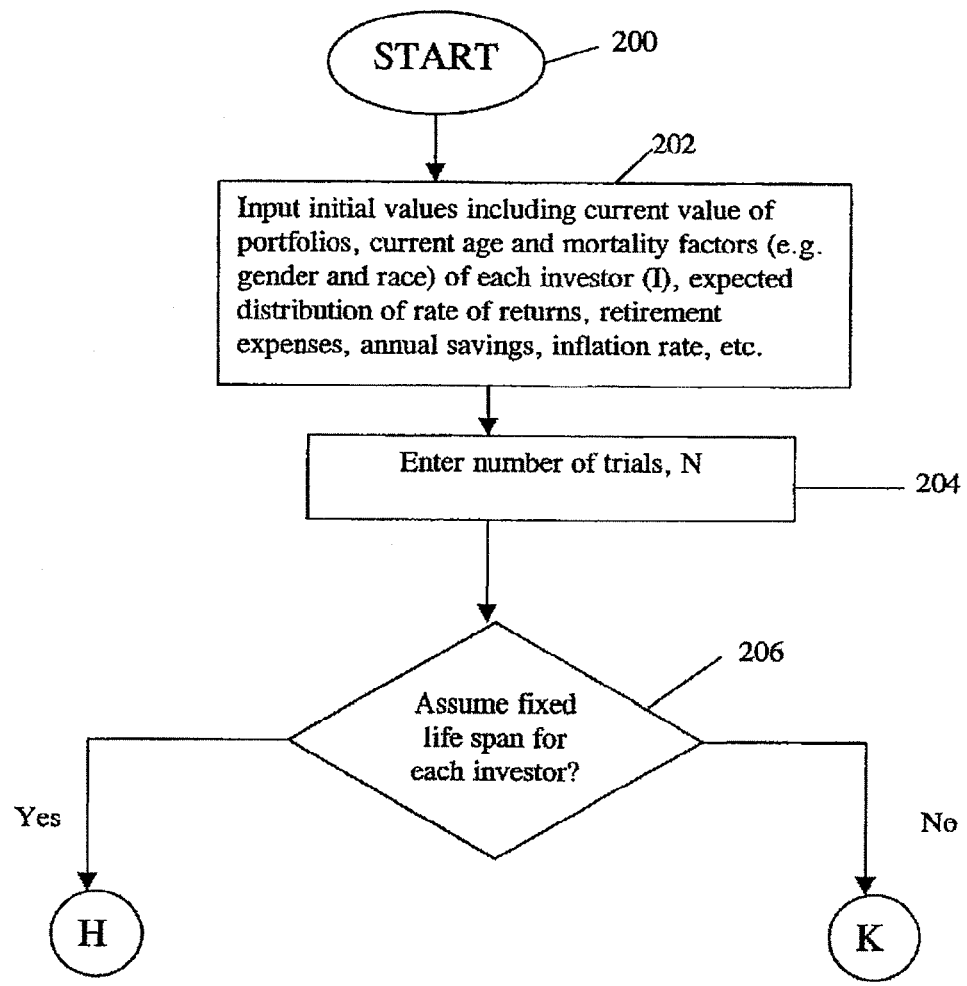
FIGS. 3A-3F provide a flow chart of the basic steps in another embodiment of the inventive method for financial planning.
Figure 3B:
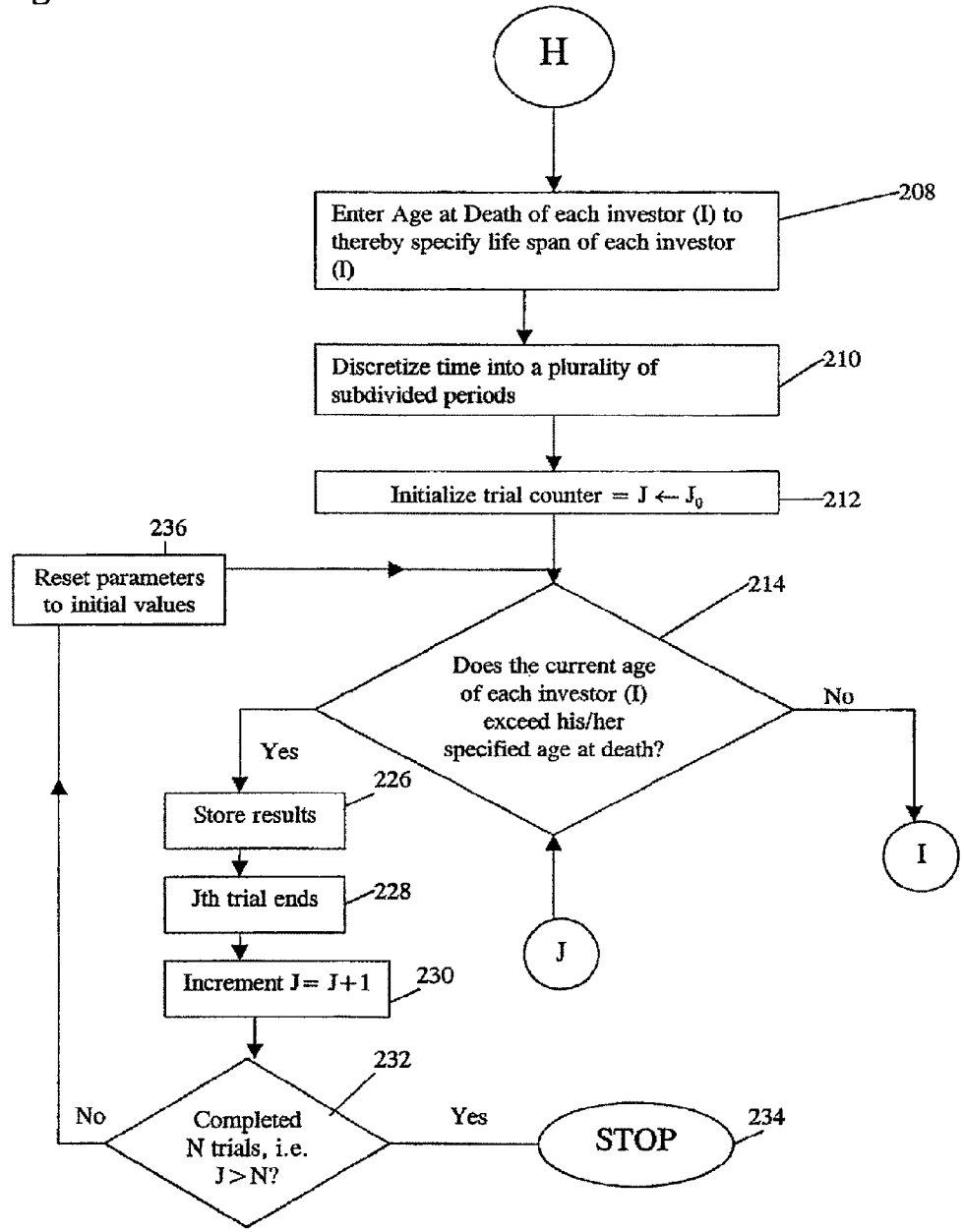
Figure 3C:
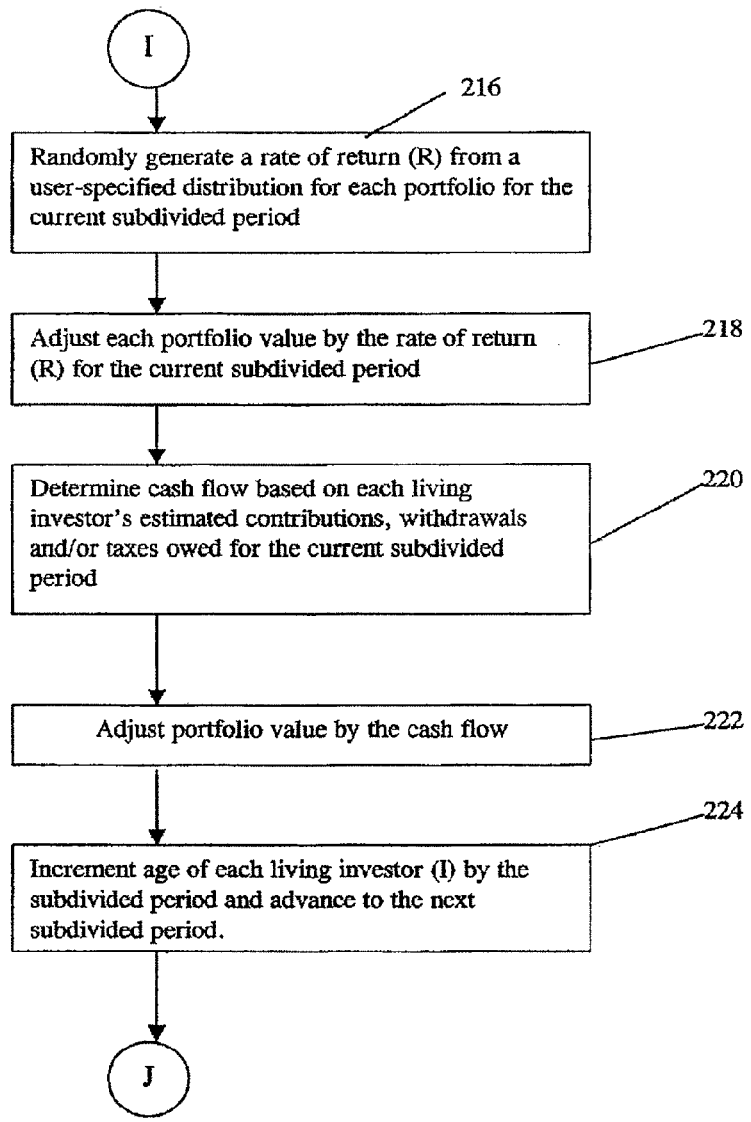

As depicted in FIG. 3A, the method begins at block 200 and requests at block 202 that the user input initial values comprising or including, for example, current values of investment portfolios, anticipated inflation rate, annual savings, retirement expenses, mortality factors (or anticipated age-at-death) of each investor, etc. Preferably, database(s) comprising a mortality table incorporating various mortality factors and a distribution of rates of return (e.g. lognormal distribution and/or historical returns) are stored in data storage such as the storage device 12. Where a lognormal distribution is employed, a user may specify a mean and standard deviation so as to vary the anticipated risk and return associated with each investment portfolio. At block 204, the user is asked to specify the number of trials for each simulation run and, at block 206, whether to assume a fixed life span for each investor or to employ a mortality table to determine the anticipated life span of each investor.

If a fixed life span is specified at block 206, then the user must specify (at block 208) the age-at-death of each investor. At block 210, the system discretizes or divides time into a plurality of subdivided periods (as for example by defining units of time in years, months etc.) so that growth of the investment portfolios may be expressed in terms of the subdivided periods. At block 212, trial counter J is initialized for counting the number of trials prior to a simulation run.

At block 214, the method queries whether the current age of each investor exceeds his/her specified age-at-death. If the answer is negative, the method proceeds to block 216 (FIG. 3C) and randomly (or pseudo-randomly) generates or draws a rate of return (R) from the stored database(s) which includes, by way of example, a rate-of-return distribution for each portfolio for the current subdivided period. Next, at block 218 the method adjusts the value of each portfolio by the rate of return (R) for the current subdivided period. At block 220, the cash flow is computed based on each still-living investor's estimated contributions (e.g. savings), withdrawals (e.g. expenses) and/or taxes owed for the current subdivided period. If an investor's hypothetical life is terminated, the cash flow (savings and withdrawal) attributable to that investor will also be terminated. The method 10 then proceeds to block 222 and adjusts the value of each portfolio by the cash flow computed at block 220. At block 224, the system increments the age of each still-living investor by an amount equal to the next subdivided period and advances the current subdivided period (e.g. 1999 A.D.) to the next subdivided period (e.g. 2000 A.D.). The method then loops back to block 214 to determine whether the current age of each investor exceeds his/her specified age-at-death. If only one of the investors has died, that information is preferably stored (block 226) and ends all cash flow attributable to that investor. The steps of blocks 216 through 224 are then repeated until all investors' hypothetical lives have terminated, at which point, the method proceeds to block 226 and stores the results from the previous steps including, for example, the results of blocks 216 through 224. Each current trial (i.e. the $J^{th}$ trial) ends at block 228 and, at block 230, the trial counter J is incremented as by an integer value of 1. At block 232, the system 10 determines whether the specified N trials have been completed; if J is greater than N, then the simulation run ends at block 234. If, on the other hand, J is less than N, the method reinitializes (at block 236) parameters such as the current age of each investor and the value of current subdivided period and the steps of blocks 214-232 are repeated.

Where the answer to the query of block 206 (FIG. 3A) is negative, the method proceeds to block 238 (FIG. 3D) and discretizes or divides time into a plurality of subdivided periods. As preliminarily described in relation to the embodiment of FIGS. 2A-2F, this process may be automatically set. In any event, the system initializes trial counter J with an initial value $J_0$ (e.g. an integer value of 1) at block 240 and then, at block 242, looks up the chance of dying ($L_{MI}$) in the next subdivided period for each investor from, for example, a stored mortality table. The mortality table may incorporate mortality factors (e.g. age, sex, race, etc.) so that the method can more accurately predict the life span of each investor. At block 244, a random or pseudo-random number ($L_{RI}$) between 0 and 1 (which may include one or more end points) is generated for the next subdivided period for each investor. Each investor's $L_{MI}$ is then compared with his/her $L_{RI}$ at block 246 according to a preselected logical relation such, for example, as "greater than or equal to" (i.e. "≥"). For example, if the investor's $L_{MI}$ is greater than or equal to his/her $L_{RI}$, that investor is presumed dead for the remainder of the current trial. If, on the other hand, the $L_{MI}$ of an investor is less than his or her $L_{RI}$, the method proceeds to block 248 (FIG. 3E) to determine his/her age-at-death using, for example, a stored or otherwise available mortality table or chart containing probabilities of living to a certain age or probabilities of dying at a certain age for a person of a particular age such as that shown in FIG. 4 for a fifty-year-old man.

In accordance with a particularly advantageous embodiment of the invention, the method determines the age-at-death of an investor by generating a random (or pseudo-random) number $L_{RI}$ for each subsequent subdivided period and compares that number with a corresponding mortality rate $L_{MI}$ for that subdivided period. The method continues to this comparison process while updating the current age of the investor at each subdivided period until the hypothetical life of the investor ends, i.e. when the $L_{RI}$ generated for a subdivided period is less than or equal to the $L_{MI}$ for that subdivided period. At such time, the method records the age of the investor during the last subdivided period as the age-at-death for that investor.

At block 250 (FIG. 3E) the method queries whether the current age of each living investor exceeds his/her determined age-at-death. If not, the method proceeds to block 252 and randomly (or pseudo-randomly) generates or draws a rate of return (R) from a rate-of-return distribution stored in data storage (e.g. device 12). The stored distribution may include a table of historical returns or a lognormal distribution with a user-specified mean and standard deviation. Next, at block 254, the value of each portfolio is adjusted using the rate of return generated at block 252 for the current subdivided period. Cash flow is then determined or computed (block 256) based on each living investor's estimated or anticipated contributions, withdrawals and/or taxes owed (or accrued) for the current subdivided period. Needless to say, savings and expenses attributable to a deceased investor will not be taken into account in this step. At block 258, the value of each portfolio is adjusted by the cash flow computed at block 256. Before looping back to block 250, the age of each living investor is incremented at block 260 by the current subdivided period and the current period is advanced to the next subdivided period. These steps (i.e. of blocks 250-260) are then repeated until the method reaches a calculated future time at which all of the investors in the current trial are no longer alive, as determined at block 250. At that point, the results are stored (block 262), the current trial is terminated (block 264), and the trial counter J is incremented by an integer value of 1 (block 266).

Figure 3D:
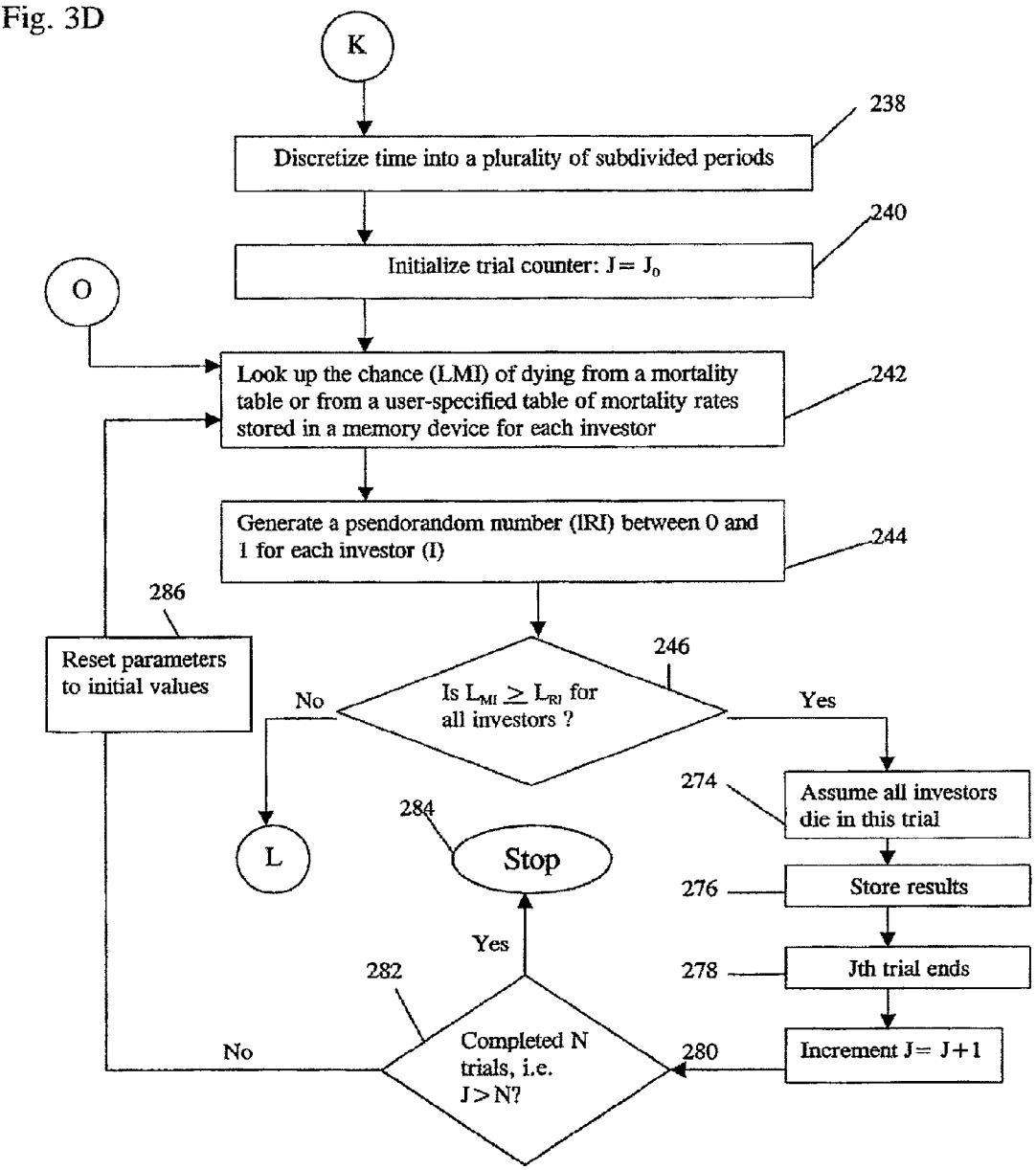
Figure 3E:
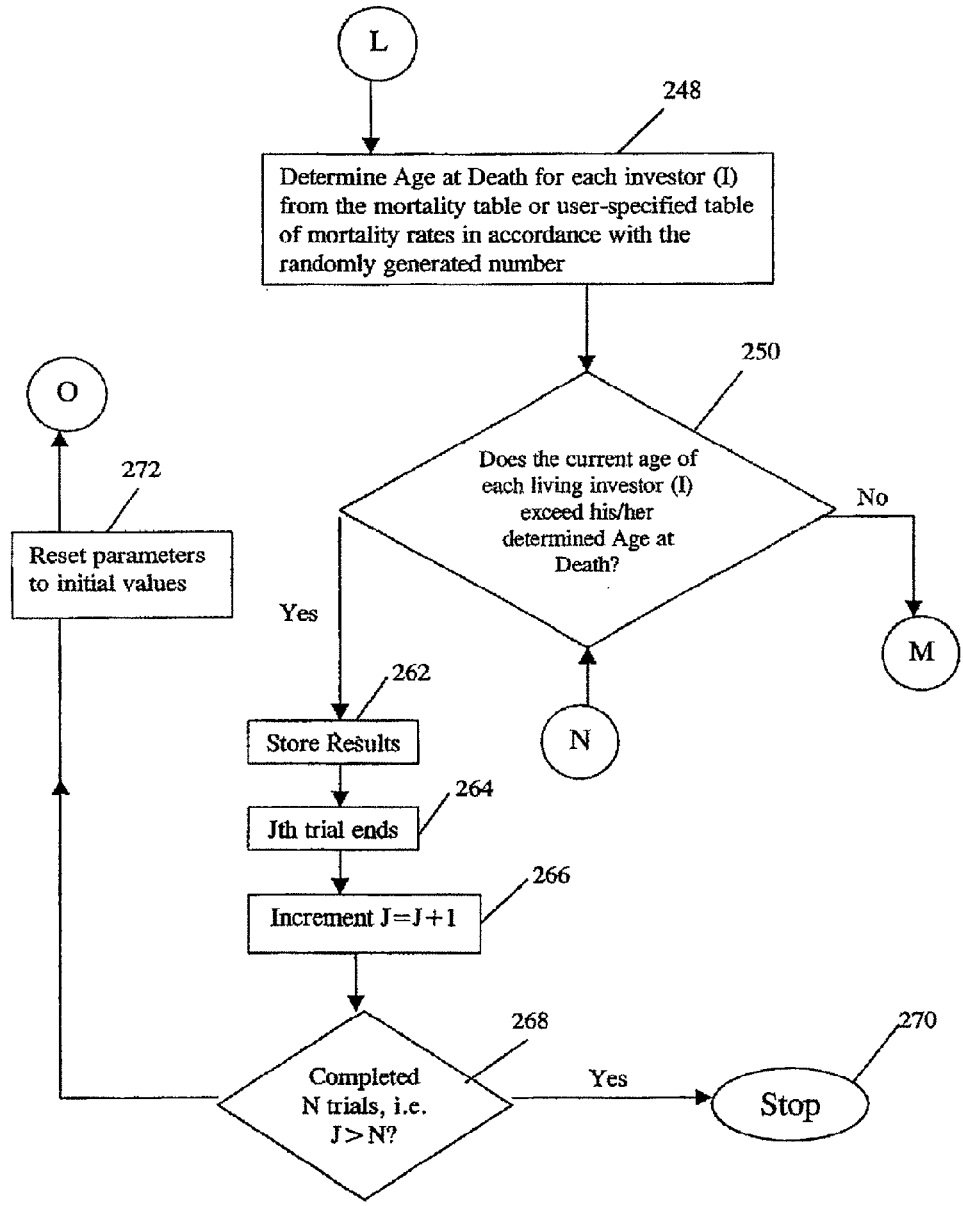
Figure 3F:
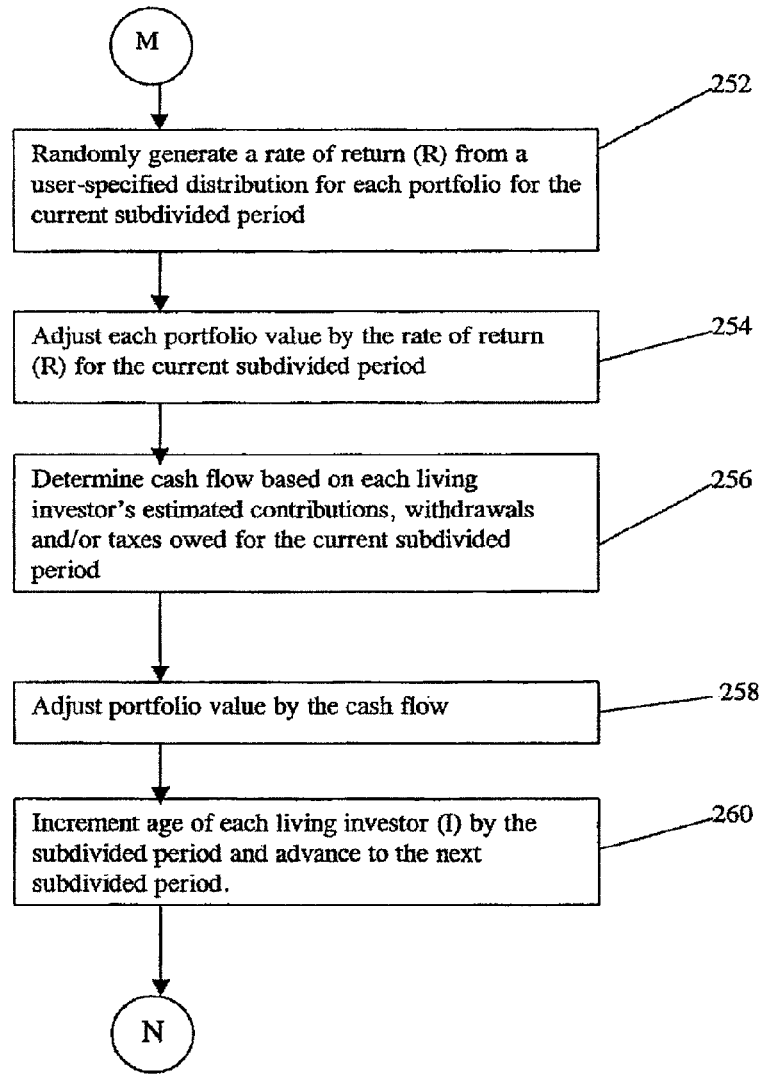
Figure 4:
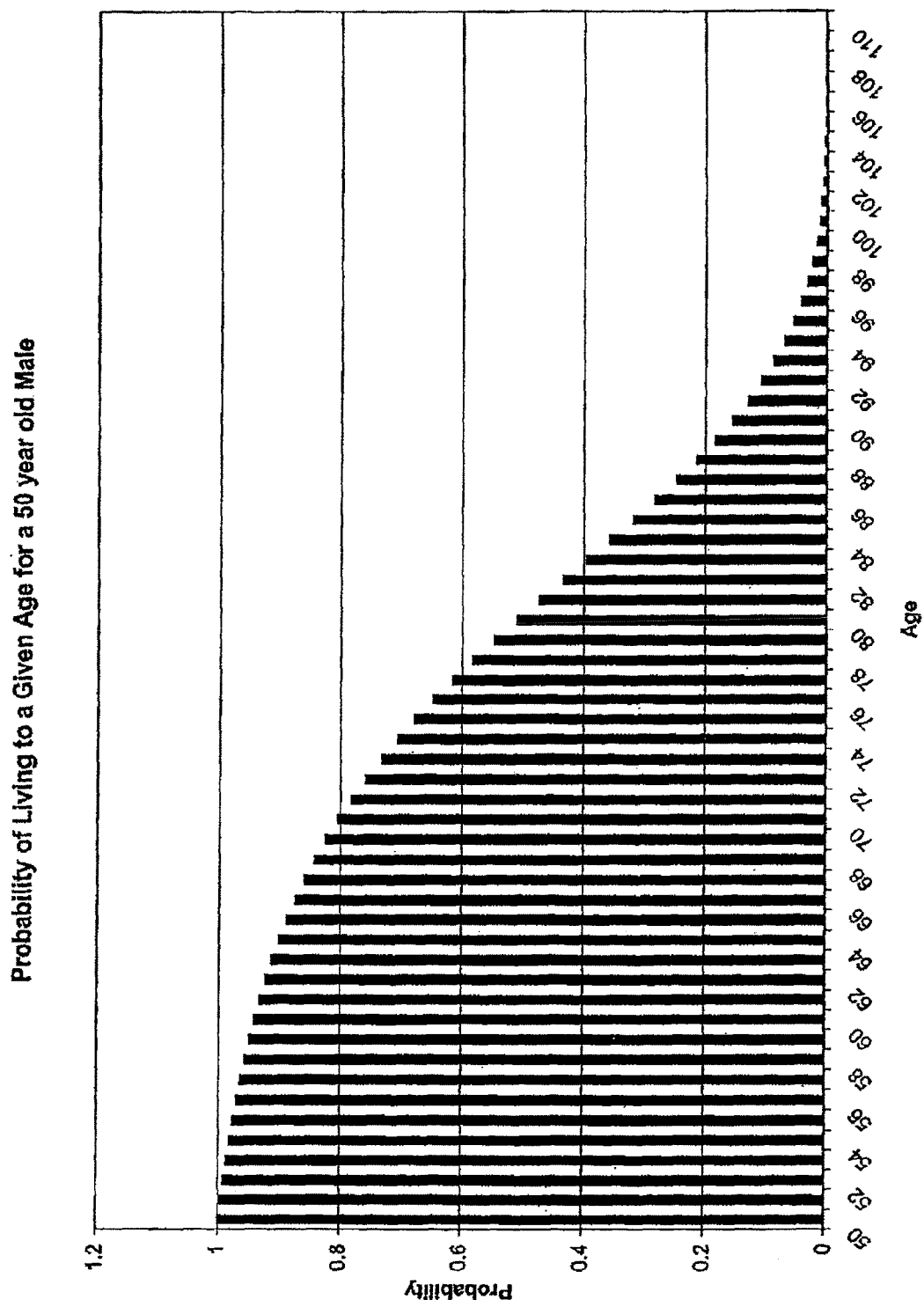
FIG. 4 is a graphical representation of an exemplary mortality table employed by the inventive system and method.

The query at block 268 then determines whether the specified N trials have been completed by asking if the current value of J is greater than N? If so, the simulation run is ended at block 270; otherwise, the method at block 272 resets parameters such as the current age of all investors, the trial counter J, and the subdivided period $T_s$ to their initial values and proceeds to block 242 (FIG. 3D). This process continues until $L_{MI}$ is greater than or equal to $L_{RI}$ for all investors, indicating at block 274 that all investors have died in the current trial. All of the results are then stored (block 276) and the current trial ends (block 278). Trial counter J is incremented by 1 (block 280), and the system determines at block 282 whether the user-specified N trials have been completed, i.e. whether J is greater than N. If the answer is positive then the simulation run is ended at block 284. If on the other hand the answer is negative, then the parameters including current age of all investors, current value of counter J, current subdivided period $T_s$, etc. are reset to their initial values, and the method, proceeds to block 242 and continues the above described steps until all trials are completed, i.e. until the current value of counter J is greater than the value of N.

At the end of a simulation run, the user may display the results of that simulation run and determine or decide whether another simulation run is desired. If so, the user may input different initial values for parameters such as inflation rate, mean and standard deviation for a rate-of-return distribution, savings and withdrawals, etc.

In another embodiment, there is provided a retirement planning method for computing possible future values of a portfolio of an investor, which includes the steps of (a) receiving a plurality of user inputs comprising an initial value of the portfolio and a current age of the investor; (b) providing data indicating cumulative probabilities of living to an age of death and/or cumulative probabilities dying at an age of death for persons of a given age group; (c) randomly drawing a number between and including 0 and 1 for the investor; (d) defining the randomly drawn number as either a cumulative probability of living to an age of death or a cumulative probability of dying at an age of death; (e) determining an age of death of the investor in accordance with the data based on the current age of the investor and the randomly drawn number; (f) computing a future value of the portfolio using the age of death of the investor determined in step (e), a predetermined rate of return, and the initial value of the portfolio; and (g) outputting the computed future value of the portfolio.

In still another embodiment, a retirement planning method for computing a possible future value of a portfolio of a plurality of joint investors includes the steps of:

(a) receiving user inputs comprising an initial value of the portfolio, a current age of a first joint investor, and a current age of a second joint investor;

(b) providing data indicating one of cumulative probabilities of living to an age of death and cumulative probabilities dying at an age of death for persons of a given age group;

(c) randomly drawing a number between 0 and 1 (which may include one or more end points) for the first joint investor;

(d) defining the randomly drawn number of step (c) as one of said one of cumulative probabilities of living to an age of death and cumulative probabilities of dying at an age of death for the first joint investor;

(e) determining an age of death of the first joint investor in accordance with said data, based on the current age of the first joint investor and the randomly drawn number of step (c);

(f) randomly drawing a number between 0 and 1 (which may include one or more end points) for the second joint investor;

(g) defining the randomly drawn number of step (f) as one of said one of cumulative probabilities of living to an age of death and cumulative probabilities of dying at an age of death for the second joint investor;

(h) determining an age of death of the second joint investor in accordance with said data based on the current age of the second joint investor and the randomly drawn number of step (f);

(i) determining the greater age of death of the first and second joint investors by comparing the age of death of the first joint investor determined in step (e) with the age of death of the second joint investor determined in step (h); and (j) computing a future value of the portfolio using said greater age of death of the joint investors, a predetermined rate of return, and the initial value of the portfolio; and (k) outputting the computed future value of the portfolio.

In still another embodiment, a retirement planning method for computing a possible future value of a portfolio of an investor, includes the steps of (a) receiving user inputs comprising an initial value of the portfolio and a current age of the investor;

(b) randomly drawing a number between 0 and 1 (which may include one or more of the end points);

(c) determining a mortality rate of the investor in accordance with a mortality table based on the current age of the investor;

(d) comparing the randomly drawn number with the determined mortality rate using a preselected logical relation such, for example, as a logical operator representing "less than or equal to" (i.e. "$\leq$") such that:

(1) if the randomly drawn number satisfies the preselected logical relation with the determined mortality rate of the investor, define the current age as the age of death of the investor;

(2) if the randomly drawn number does not satisfy the preselected logical relation with the determined mortality rate, advance the current age of the investor to a next age group indicated in the mortality table and repeat steps (b) through (d);

(e) computing a future value of the portfolio using the age of death defined in step (d)(1), a predetermined rate of return, and the initial value of the portfolio; and (f) outputting the computed future value of the portfolio.

In still another embodiment, a retirement planning method for computing a possible future value of a portfolio of an investor includes the steps of:

(a) receiving user inputs comprising an initial value of the portfolio and a current age of the investor;

(b) randomly drawing a number between 0 and 1 (which may include one or more end points);

(c) determining a mortality rate of the investor in accordance with a mortality table based on the current age of the investor;

(d) comparing the randomly drawn number with said determined mortality rate using a preselected logical relation such that:

(1) if the randomly drawn number satisfies said preselected logical relation with said determined mortality rate of the investor, define the current age as the age of death of the investor;

(2) if the randomly drawn number does not satisfy said preselected logical relation-with said determined mortality rate, advance the current age of the investor to a next age group indicated in the mortality table and repeat steps (b) through (d);

(e) computing a future value of the portfolio using the age of death defined in step (d)(1), a predetermined rate of return, and the initial value of the portfolio; and (f) outputting the computed future value of the portfolio.

In yet another embodiment, a retirement planning method for computing a possible future value of a portfolio of a plurality of joint investors, includes the steps of:

(a) receiving user inputs comprising an initial value of the portfolio, a current age of a first joint investor, and a current age of a second joint investor;

(b) randomly drawing a number between 0 and 1 (which may include one or more end points) for the first joint investor;

(c) determining a mortality rate of the first joint investor in accordance with a mortality table based on the current age of the first joint investor;

(d) comparing the randomly drawn number with said determined mortality rate for the first joint investor using a preselected logical relation such that:
  (1) if the randomly drawn number satisfies said preselected logical relation with said determined mortality rate of the first joint investor, define the current age as the age of death of the first joint investor;
  (2) if the randomly drawn number does not satisfy said preselected logical relation with said determined mortality rate, advance the current age of the investor to a next age group indicated in the mortality table and repeat steps (b) through (d);
(e) randomly drawing a number between 0 and 1 (which may include one or more end points) for the second joint investor;
(f) determining a mortality rate of the second joint investor in accordance with the mortality table based on the current age of the second joint investor;
(g) comparing the randomly drawn number with said determined mortality rate for the second joint investor using the preselected logical relation such that:
  (1) if the randomly drawn number satisfies said preselected logical relation with said determined mortality rate of the second joint investor, define the current age as the age of death of the second joint investor; and
  (2) if the randomly drawn number does not satisfy said preselected logical relation with said determined mortality rate, advance the current age of the investor to a next age group defined in the mortality table, and repeat steps (e) through (g);
(h) determining the greater age of death of the joint investors by comparing the age of death of the first joint investor defined in step (d)(2) with the age of death of the second joint investor defined in step (g)(2);
(i) computing a future value of the portfolio using the greater age of death determined in step (g), a predetermined rate of return, and the initial value of the portfolio; and
(j) outputting the computed future value of the portfolio.

The random numbers may be drawn so as to provide greater assurance that the ages of death derived for the investor over the number of trials are distributed in a manner similar to that implied by the mortality (or vitality) table. In one embodiment, the interval between 0 and 1 is divided into a plurality of partitions (e.g., m number of partitions), and a preselected quantity ($S_i$) of random numbers is drawn from each of the plurality of partitions. The preselected quantity ($S_i$) of random numbers is preferably proportional to the size of the corresponding partition. Thus, the interval of 0 to 1 may, for example, be divided into three partitions: 0 to 0.1, 0.1 to 0.5, and 0.5 to 1.0 (representing 10%, 40%, and 50% of the interval, respectively). For a sample size of 1000 random numbers, 100 random numbers may be drawn from the partition 0 to 0.1 (the first partition), 400 random numbers from 0.1 to 0.5 (the second partition), and 500 from 0.5 to 1.0 (the third partition). The random numbers from each partition may or may not include the end points of each partition. Each partition may or may not be of the same size.

An example is illustrated as follows: For each partition from i=1 to m, select $S_i$ random numbers between end points LBOUND and UBOUND where LBOUND=(Sum of $S_j$)/N for j=1 to i-1 (note that LBOUND=0 when i=1), UBOUND= (Sum of $S_j$)/N for j=1 to i, and N=the total number of random numbers. Generate an Age At Death of an investor using each random number in place of the random drawn number called for in anyone of the methods described above.

More specifically:
Step 1. Select m as the number of partitions and S(i) as the quantity of random numbers to select from the $i^{th}$ partition.
Step 2. Let N=Sum of S(i) for i=1 to m
Step 3. Let PARTITION_CTR=1
Step 4. Let LBOUND=0
Step 5. Let UBOUND=S(i)
Step 6. Let CUM_SI=S(PARTITION_CTR)
Step 7. Let j=1
Step 8. Let RND=a random number between 0 and 1
Step 9. Let RND=(RND*(UBOUND−LBOUND)+LBOUND)/N
Step 10. Generate an Age At Death of an investor using one of the above-described methods using RND in place of the random number.
Step 11. Let j=j+1
Step 12. If j is less than or equal to S(PARTITION_CTR) then goto Step 8, otherwise continue.
Step 13. Add 1 to PARTITION_CTR
Step 14. If PARTITION_CTR>m then Stop otherwise continue
Step 15. Let CUM_SI=CUM_SI+S(PARTITION_CTR)
Step 16. Let LBOUND=UBOUND
Step 17. Let UBOUND=CUM_SI
Step 18. Goto Step 7

In another embodiment, the interval of 0 to 1 is divided into a sequence of numbers uniformly distributed between 0 and 1, for example: 0.1, 0.2, 0.3 . . . 0.9. The end points (i.e., 0 and 1) may or may not be included in the sequence. Each of these uniformly distributed numbers may then be used in place of the randomly drawn numbers as described in the above embodiments. For example, each of these uniformly distributed numbers may be used in conjunction with a mortality (or vitality) table to determine the age of death of an investor for a subdivided period or a trial. Note that this method produces N ages at death distributed as the mortality (or vitality) table would imply.

A specific example is illustrated as follows:
Step 1. Start. Select a sample size of N (e.g. 1000).
Step 2. Let a variable RND=0
Step 3. Add 1/(N+1) to RND
Step 4. Generate an Age At Death using any of the above-described methods using RND in place of the randomly drawn number.
Step 5. If RND>=N/(N+1) then stop. Otherwise return to Step 3.

As stated above, as an alternative to using the mortality tables to select a life expectancy of an investor, ages at death can be derived from a mortality table, a vitality table, a mortality table with cumulative probabilities, or a vitality table with cumulative probabilities. Moreover, such ages can be randomly generated by the following inventive techniques, which can, alternatively, be used to generate an age of death for use in the embodiments disclosed above.

Method 1. Using Mortality Table
Step 1. Start. Let the Age at Death equal the current age of the person.
Step 2. Increment the Age At Death by one time period (e.g. by one year).
Step 3. Look up probability of dying at the Age at Death in this period in the mortality table.
Step 4. Generate a random number uniformly distributed between 0 and 1. If the random number is less than the probability of death, then stop. Otherwise return to Step 2.

Method 2. Using Vitality Table

Step 1. Start. Let the Age At Death equal the current age of the person.

Step 2. Increment the Age At Death by one time period (e.g. by one year).

Step 3. Look up probability of living through this period in the vitality table.

Step 4. Generate a random number uniformly distributed between 0 and 1. If the random number is greater than or equal to the probability of living, then stop. Otherwise return to Step 2.

Method 3. Using Mortality Table with Cumulative Probabilities

Step 1. Start.

Step 2. Generate a random number uniformly distributed between 0 and 1.

Step 3. Using the Mortality table with the Cumulative Probabilities table, find the age which most closely corresponds to the probability generated in Step 2. This age is the Age at Death.

Method 3a. Using Mortality Table (More General Case of Method 3)

Step 1. Start

Step 2. Divide the segment 0-1 into intervals representing all the possible ages at death for a person. The size of each interval corresponds to the probability of dying at that age.

Step 3. Generate a random number uniformly distributed between 0 and 1.

Step 4. Identify the interval which contains the random number generated in Step 3. The age at death is the age which corresponds with this interval.

Method 4. Using Vitality Table with Cumulative Probabilities

Step 1. Start.

Step 2. Generate a random number uniformly distributed between 0 and 1.

Step 3. Using the Vitality table with the Cumulative Probabilities table, find the age which most closely corresponds to the probability generated in Step 2. This age is the Age At Death.

Each of the above methods generates one age at death. The methods can be performed repeatedly to generate a sample set of ages at death. The sample will reflect the distribution of ages at death implied by the table used (e.g. mortality, vitality, etc.). However, any given sample may have an average or other distribution (substantially) different from that implied by the table. All of the above methods are based on random numbers uniformly distributed between 0 and 1 and may be used for randomly generating ages at death may be used for more than one person (e.g. a couple) by repeating the process for each person.

Method 5. Stratified sampling. This method provides greater assurance that the sample set of ages of death will be distributed as the mortality (vitality) table would imply. It divides the 0-1 interval into m partitions and generates $S(i)$ random numbers $[S(1) \ldots S(m)]$ in each partition for a total sample size $N=Sum[S(i)]$ for $i=1$ to $m$.

For each partition $i=1$ to $m$, select $S(i)$ random numbers between LBOUND and UBOUND where LBOUND=Sum $(Sj)/N$ for $j=1$ to $i-1$ (note LBOUND=0 when $i=1$) and UBOUND=Sum $(Sj)/N$ for $j=1$ to $i$. Generate an Age At Death using each random number as the input in place of the random number called for in one of the 4 methods described above.xxx This method is explained further in the following example.

Step 1. Select m as the number of partitions and $S(i)$ as the number of random numbers to select in the $i^{th}$ partition.

Step 2. Let $N=Sum[S(i)]$ for $i=1$ to $m$

Step 3. Let PARTITION_CTR=1

Step 4. Let LBOUND=0

Step 5. Let UBOUND=S(i)

Step 6. Let CUM_SI =(PARTITION_CTR)

Step 7. Let j=1

Step 8. Let RND=a random number between 0 and 1

Step 9. Let RND=(RND*(UBOUND−LBOUND)+LBOUND)/N

Step 10. Generate an Age At Death using one of the 4 methods described above using RND in place of the random number.

Step 11. Let j=j+1

Step 12. If j≤S(PARTITION_CTR) then go to Step 8, otherwise continue

Step 13. Add 1 to PARTITION_CTR

Step 14. If PARTITION_CTR>m then Stop otherwise continue

Step 15. Let CUM_SI=CUM_SI+S(PARTITION_CTR)

Step 16. Let LBOUND=UBOUND

Step 17. Let UBOUND=CUM_SI

Step 18. Go to Step 7

The following routine generates a set of ages distributed very closely to that implied by the table. It is similar to Method 5 in which M=N and S=1. The following method generates N numbers uniformly distributed between 0 and 1. These numbers are used to generate the ages at death. It should be noted that there is no randomness implied by the following method. Rather it produces N ages at death distributed as the mortality (vitality) table would imply.

Method 6.

Step 1. Start. Select a sample size of N (e.g. 1000).

Step 2. Let a variable RND=0

Step 3. Add 1/(n+1) to RND

Step 4. Generate an Age at Death using one of the 4 methods described using RND in place of the random number.

Step 5. If RND≥n/(n+1) then stop. Otherwise return to Step 3.

The following routine generates pairs of ages at death Method 7. (Similar to Method 3a) Method 3a. Using Mortality Table (more general case of Method 3)

Step 1. Start

Step 2. Divide the segment 0-1 into intervals representing all the possible pairs of ages at death for a couple. The size of each interval corresponds to the probability of dying at those ages.

Step 3. Generate a random number uniformly distributed between 0 and 1.

Step 4. Identify the interval which contains the random number generated in Step 3. The ages at death are the ages which correspond to this interval.

Projections are often used in investment planning, particularly for retirement. In such a projection, the portfolio value is projected given an initial value, a series of expected cash flows, a time horizon, and a series of rates of return. Conventional methods assume a fixed time horizon and a fixed rate of return. In a retirement planning situation, the investor(s) wants to be able to project the portfolio value until his (their) death. Obviously the age at death is uncertain. It is, therefore, beneficial to calculate a number (N) of portfolio projections or trials for a set of ages at death. One technique for accomplishing this is described below.

Each trial is assigned a corresponding age at death which determines the length of time the trial will run. The age of death can be derived or calculated or selected from any of the methods disclosed above. An age at death may be derived for each member of a couple (or even a group). The trial will end when the last person in the group dies. The portfolio value is initialized to a beginning or initial value. For each period in the projection the portfolio value is updated based on a rate of return (either fixed or randomly generated). The portfolio value is adjusted for any cash flows expected to occur within that period. A trial may be terminated early (before death) if the portfolio runs out of money, or the value may be allowed to assume negative values. A trial is considered a success if the ending portfolio value exceeds some target value. Otherwise it is a failure.

Running large numbers of trials lets a user of the method derive or calculate success of a particular portfolio based on the selected variables. The distribution of portfolio values at various time periods (e.g. after 1 year, 5 years, 10 years etc.) can also be examined and a set of ages at death can be generated by running any of the above methods N times to create N projections. Alternatively, we could use any of methods 1-4 to calculate an age at death. Then we could a projection using this age. We could repeat these steps N times. Still another alternative is to create a projection that determines the age of death as the projection is created. This requires using method 1 or 2. A loop (as described in each method) is performed that also updates the portfolio value and tests whether the person is still alive. The loop continues until the person or the last person in the couple or group dies.

It should be appreciated that although the time periods are typically yearly increments, the method could be used for other periods (e.g. months or days). Allowing the ages at death to vary lends itself well to modeling cash flows that depend upon that age at death such as life insurance and social security payments. Alternatively, cumulative tables could show a lifespan (number of years to live) instead of an age. Moreover, fractional ages can be used by interpolating values in the mortality or vitality tables.

It is contemplated that the inventive method also allows a user to specify a variety of spending rules for an investor. Illustrative examples of such spending rules include: spending 5% of the portfolio value of a previous subdivided period $T_s$; spending 3% of the average value of the portfolio value over a period of time (e.g. 5 years); or initially spending 5% of the portfolio value and then adjusting the portfolio value by the anticipated inflation rate, but not allowing the investor's spending to exceed a specified maximum percentage and/or fall below a specified minimum percentage.

It is also contemplated that the method take into account an investor's expected or anticipated inheritance by, for example, applying the mortality table to his/her benefactor in the manner described above. It is further contemplated that the method incorporate the effect of taxes on the value of each portfolio. Separate portfolios for taxable, tax-deferred (e.g. traditional IRA) and tax-exempt (e.g. Roth IRA) accounts may be assumed. Furthermore, different return and risk assumptions may be specified for each portfolio. Importantly, the correlation coefficient of the returns among the asset classes (e.g. bonds, large cap stocks, small cap stocks) may also be specified by the user. For each subdivided period $T_s$, rates of return may be randomly or pseudo-randomly drawn from different distributions having an assumed mean and standard deviation. In addition, the assumed rates of return may be drawn from distributions that are correlated with each other.

For taxable accounts, the method will recognize and take into account that the realized gains, based on a user-defined cost basis, turnover and tax rates, will be taxed at capital gains rates, while income (based on yield) will be taxed at ordinary income tax rates. Similarly, withdrawals from tax deferred accounts will be taxed at ordinary income tax rates while tax exempt accounts will not be taxed.

It is also contemplated that the method allows the user to specify dynamic return-and-risk assumptions. Dynamic return-and-risk assumptions refer to the variation of the mean and standard deviation for the rate-of-return distribution for each trial. This assumption may be based for example on the passage of time (e.g. for modeling an investor who has become more conservative over time), an event (e.g. retirement of an investor), or the portfolio value itself relative to a stated goal (e.g. the calculated return required to meet the stated goal).

It is further intended that the stored mortality table be updated at appropriate times.

It is also contemplated that the inventive method allows the projected return to be based directly on historical returns. Thus, by a database of historical returns for various asset classes the inventive method and apparatus can generate a return for a subdivided period $T_s$ by randomly drawing a rate of return from a historical period and applying that rate to each investment portfolio for that subdivided period $T_s$.

It should additionally be understood that although the inventive method has been described in connection with the disclosed hardware system 10, it may also be applied to a general-purpose digital computer incorporating the appropriate hardware architecture and elements.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter or design choice.

What is claimed is:

1. A computer implemented method:
   (a) receiving, using a data processing system, user inputs comprising an initial value of the portfolio, a current age of a first joint investor, and a current age of a second joint investor;
   (b) providing, using the data processing system, data indicating one of cumulative probabilities of living to an age of death and cumulative probabilities dying at an age of death for persons of a given age group;
   (c) randomly drawing, using the data processing system, a number between 0 and 1 for the first joint investor and a number between 0 and 1 for the second joint investor;
   (d) defining, using the data processing system, the randomly drawn number of step (c) for the first joint investor as one of said one of cumulative probabilities of living to an age of death and cumulative probabilities of dying at an age of death for the first joint investor and the randomly drawn number of step (c) for the second joint investor as one of said one of cumulative probabilities of living to an age of death and cumulative probabilities of dying at an age of death for the second joint investor;
   (e) determining, using the data processing system, an age of death of the first joint investor and the second joint investor in accordance with said data based on the current age of the respective first and second joint investors and the randomly drawn numbers of step (c);

(f) determining, using the data processing system, the greater age of death of the first and second joint investors by comparing the age of death of the first joint investor determined in step (e) with the age of death of the second joint investor determined in step (e);

(g) computing, using the data processing system, a future value of the portfolio using said greater age of death of the joint investors, a predetermined rate of return, and the initial value of the portfolio; and (h) outputting the computed future value of the portfolio.

2. The method of claim 1, wherein the user inputs further include at least one mortality factor and the data further include the at least one mortality factor, and wherein the at least one mortality factor is selected from a group consisting of the gender of the investor and the racial group of the investor.

3. The method of claim 1, wherein the user inputs include the predetermined rate of return.

4. The method of claim 1, wherein the user inputs further include an average rate of return and a standard deviation for defining a lognormal distribution of rates of return, and the predetermined rate of return is randomly selected from the lognormal distribution of rates of return.

5. The method of claim 1, wherein said steps of drawing a random number (step (c)), further comprises drawing the random number such that the ages of death derived for the first and second investor over N number of trials are distributed substantially similar to one of cumulative probabilities of living to an age of death and cumulative probabilities dying at an age of death for persons of a given age group.

6. The method of claim 5, wherein an interval between randomly drawn numbers between 0 and 1 for the first and second investors is divided into a plurality of partitions, and wherein a preselected quantity of random numbers is drawn from each of the plurality of partitions.

7. The method of claim 6, wherein the preselected quantity of random numbers is proportional to the size of the corresponding partition.

8. The method of claim 5, wherein an interval between randomly drawn numbers between 0 and 1 for the first and second investor is divided into a sequence of numbers uniformly distributed between 0 and 1.

9. The method of claim 8, wherein each number from the sequence of numbers uniformly distributed between 0 and 1 is used in conjunction with one of cumulative probabilities of living to an age of death and cumulative probabilities dying at an age of death for persons of a given age group to determine the age of death of the first and second investor for a subdivided period or a trial.

10. The method of claim 1, wherein the user inputs further include at least one mortality factor and the data further include the at least one mortality factor, and wherein the at least one mortality factor being the gender of the investor.

11. A system for computing a possible future value of a portfolio of joint investors, comprising:
a memory, configured for storing image data; and
a processor, coupled to the memory, configured for:
receiving, using a data processing system, user inputs comprising an initial value of the portfolio, a current age of a first joint investor, and a current age of a second joint investor;
providing, using the data processing system, data indicating one of cumulative probabilities of living to an age of death and cumulative probabilities dying at an age of death for persons of a given age group;
randomly drawing, using the data processing system, a number between 0 and 1 for the first joint investor and a number between 0 and 1 for the second joint investor;
defining, using the data processing system, the randomly drawn number for the first joint investor as one of said one of cumulative probabilities of living to an age of death and cumulative probabilities of dying at an age of death for the first joint investor and the randomly drawn number for the second joint investor as one of said one of cumulative probabilities of living to an age of death and cumulative probabilities of dying at an age of death for the second joint investor;
determining, using the data processing system, an age of death of the first joint investor and the second joint investor in accordance with said data based on the current age of the respective first and second joint investors and the respective randomly drawn numbers the respective first and second joint investors;
determining, using the data processing system, the greater age of death of the first and second joint investors by comparing the age of death of the first joint investor with the age of death of the second joint investor;
computing, using the data processing system, a future value of the portfolio using said greater age of death of the joint investors, a predetermined rate of return, and the initial value of the portfolio; and
outputting the computed future value of the portfolio.

12. The system of claim 11, wherein the user inputs further include at least one mortality factor and the data further include the at least one mortality factor, and wherein the at least one mortality factor is selected from a group consisting of the gender of the investor and the racial group of the investor.

13. The system of claim 11, wherein the user inputs include the predetermined rate of return.

14. The system of claim 11, wherein the user inputs further include an average rate of return and a standard deviation for defining a lognormal distribution of rates of return, and the predetermined rate of return is randomly selected from the lognormal distribution of rates of return.

15. The system of claim 11, wherein said steps of drawing a random number further comprises drawing the random number such that the ages of death derived for the first and second investor over N number of trials are distributed substantially similar to one of cumulative probabilities of living to an age of death and cumulative probabilities dying at an age of death for persons of a given age group.

16. The system of claim 15, wherein an interval between randomly drawn numbers between 0 and 1 for the first and second investors is divided into a plurality of partitions, and wherein a preselected quantity of random numbers is drawn from each of the plurality of partitions.

17. The system of claim 16, wherein the preselected quantity of random numbers is proportional to the size of the corresponding partition.

18. The system of claim 15, wherein an interval between randomly drawn numbers between 0 and 1 for the first and second investor is divided into a sequence of numbers uniformly distributed between 0 and 1.

19. The system of claim 18, wherein each number from the sequence of numbers uniformly distributed between 0 and 1 is used in conjunction with one of cumulative probabilities of living to an age of death and cumulative probabilities dying at an age of death for persons of a given age group to determine the age of death of the first and second investor for a subdivided period or a trial.

\* \* \* \* \*